United States Patent

Mitchell

[15] 3,653,753
[45] Apr. 4, 1972

[54] OPTICAL SHUTTER SYSTEM AND METHODS RELATED THERETO

[72] Inventor: Robert W. Mitchell, St. Joseph, Mich.
[73] Assignee: Seneca Plastic Limited, Toronto, Canada
[22] Filed: July 22, 1970
[21] Appl. No.: 57,086

[52] U.S. Cl............................................352/100, 352/81
[51] Int. Cl........................................................G03b 17/02
[58] Field of Search..................352/100, 81; 40/125 M, 137

[56] References Cited

UNITED STATES PATENTS 742,632   10/1903   Hadden................................352/100

*Primary Examiner*—Donald O. Woodiel
*Attorney*—Pendleton, Neuman, Williams & Anderson

[57] ABSTRACT

An optical shutter system and methods of establishing the relative positions of the elements of the system are disclosed for use in simulated animated displays, in enabling viewing an image where the viewer and image are moving relative to one another at a rapid rate, and in related applications. A series of images which may be progressively varied and carried on transparencies are associated with the optical shutter system. The shutter system includes a linear light source and a pellucid sheet and may include one or more reflective surfaces selectively oriented with respect to the transparencies on the side of the transparency opposite the viewer. When there is effective relative movement between the viewer and the transparencies, the light appears to sweep across each transparency, progressively illuminating linear adjacent segments of each image; thus the viewer perceives a motion picture composed of the progressively illuminated image segments.

Methods are also disclosed for establishing the orientation of the elements of the optical shutter system relative to each other and to the transparency to be observed. The methods take into account the range of expected viewing distances and the dimensions of the transparency, as well as the space available in varying environments for mounting the system, the light intensity desired and the repetition rate required for optimum viewing.

25 Claims, 12 Drawing Figures

PATENTED APR 4 1972          3,653,753

INVENTOR
Robert W. Mitchell
by Pendleton, Neuman,
Williams & Anderson
Att'ys

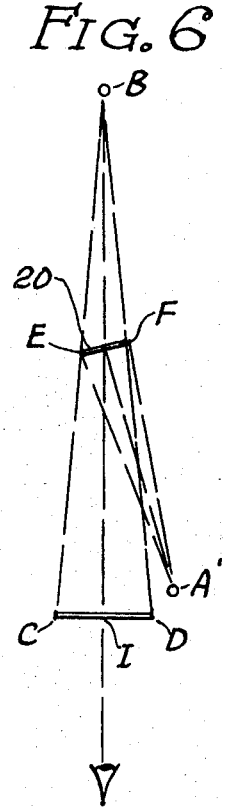
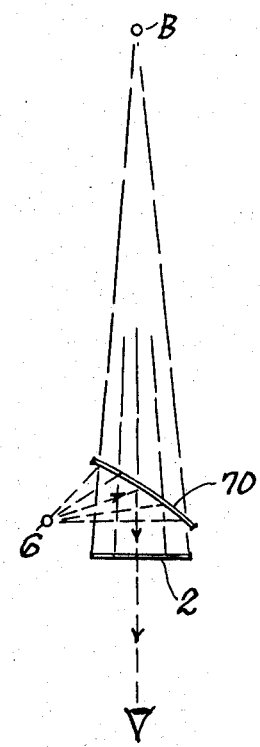
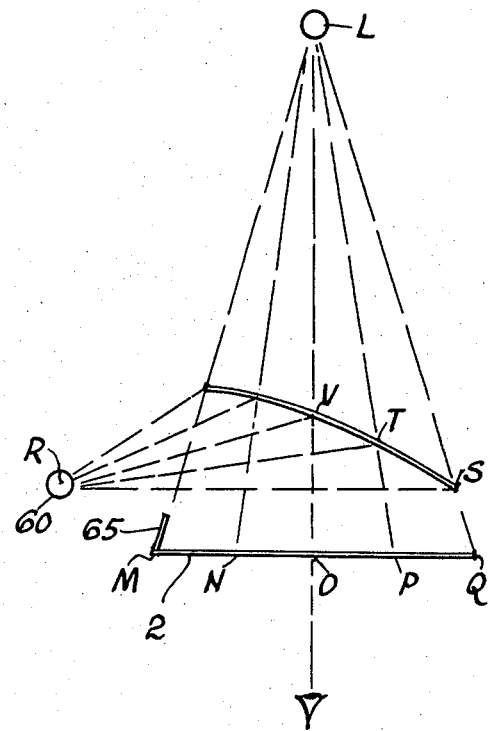
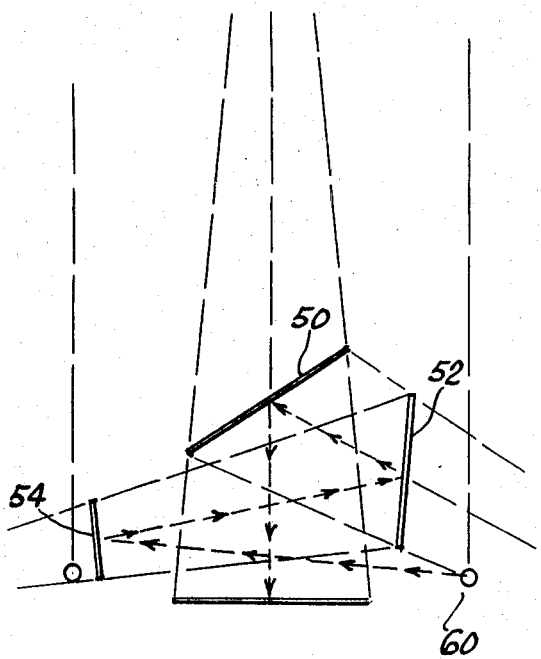
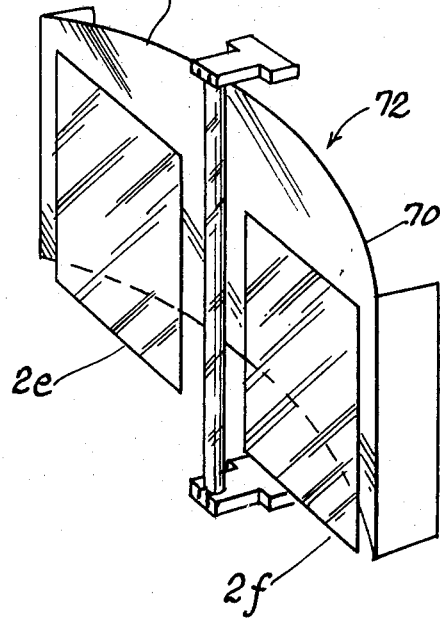

3,653,753

OPTICAL SHUTTER SYSTEM AND METHODS RELATED THERETO

BACKGROUND OF THE INVENTION

The present invention relates to an optical shutter and more particularly to a display system, incorporating the shutter, which presents a simulated display to a viewer where there is relative motion between the viewer and the light source.

An exemplary field of use for this invention is an installation including a plurality of the shutters comprising linear light sources associated with pellucid sheets bearing the images from an animated display to be presented on the wall of a subway tunnel, elevator shaft or similar area. The movement of the subway train provides relative motion between the light sources, animated scenes and the observer, and it is this relative movement between an observer, a pellucid image, and a linear light source that comprises the operating mechanism of the shutter. Among the problems presented by such an installation are that the permissible depth of the installation is limited by the available space between the mounting wall and the side of the train. The installation must also be designed for inexpensive maintenance and replacement of the animated scenes and the other elements of the installation. Moreover, the installation must be arranged so that the animated display is clearly presented to the viewer, and not blurred by the speed of passage of the train.

Many attempts have been made to produce a simulated animated display where there is relative motion between a viewer and a fixture carrying a succession of animated images. Some such systems have used the relative motion as a control means for a switching system or the like. Typical prior art systems are disclosed in U.S. Pat. Nos. 3,463,581; 2,833,176; 3,329,475; 3,480,352; 2,438,878; 2,401,271; 2,299,731; 3,261,120; and 2,618,067. Some of these patents utilize scanning assemblies including convergent, anamorphic or other special purpose lenses located between the animated scenes and the observer. Such lenses increase the cost of the installation, and require considerable maintenance. Moreover, none of these special-purpose lens systems incorporate a lighting arrangement to render them usable in areas of limited ambient light or utilize the unique principle of this invention.

Other patents disclose a display system including a series of pictures directly illuminated by individually triggered light sources, light switches, mechanical shutters and the like. The system is mounted on a wall beside the moving vehicle whose passage triggers the momentary illuminating flash when the vehicle is adjacent each picture. Such systems result in blurring for many reasons, one being that no economically feasible light source provides the short duration, high intensity light required and timing becomes critical. Such systems would be very expensive.

SUMMARY OF THE INVENTION

Therefore, an object of the present invention is to present a reconstructed display to a viewer in motion relative to the display.

Another object of the invention is to provide a display system usable in areas of limited or unlimited ambient light.

Another object of the invention is to provide an optical shutter adapted for use in an animated display system.

Another object of the invention is to provide an animated display system including an optical shutter whose basic elements may be modified in accordance with the methods disclosed to meet the limitations imposed by varying environments.

In the display system in which the optical shutter is disclosed, the shutter system includes a linear light source mounted on one side of a pellucid sheet with means being provided for producing relative movement between the pellucid sheet and linear source on the one hand and a viewer on the side of the sheet opposite the source. Particular advantages are gained by using reflective surfaces to relocate the light to the edge of the sheet. As used herein, the term "transparency" refers to a particular pellucid sheet and is generally a photographic film for carrying one image of a series of scenes to be presented to a viewer in motion relative to the transparency. The reflective surfaces are so designed and oriented that as the observer and transparency move relatively, the vertical line of light appears through the transparency and traverses the width of the image, presenting the image in successive segments as the relative positions of observer, image and light change. When a series of units carrying a succession of animated images are observed, a simulated animated display is perceived by the observer.

DESCRIPTION OF THE DRAWINGS

FIG. is an exploded diagrammatic right side view of the optical shutter of FIG. 3 illustrating the minimum relative height of the various components of the optical shutter of FIG. 3. passenger

FIG. 6 is a diagrammatic top plan view of a portion of another embodiment of the optical shutter system.

FIG. 7 is a diagrammatic top plan view of a portion of still another embodiment of the optical shutter system.

FIG. 8 is a diagrammatic top plan view of a portion of an additional embodiment of the optical shutter system.

FIG. 9 is a diagrammatic top plan view illustrating an empirical method of establishing the curvature of the shutter of FIG. 8.

FIG. 10 is a perspective view of a portion of another system incorporating the optical shutter of FIG. 8 and designed in accordance with the method of FIG. 9.

DESCRIPTION OF THE PREFERRED EMBODIMENT

Figure 1:
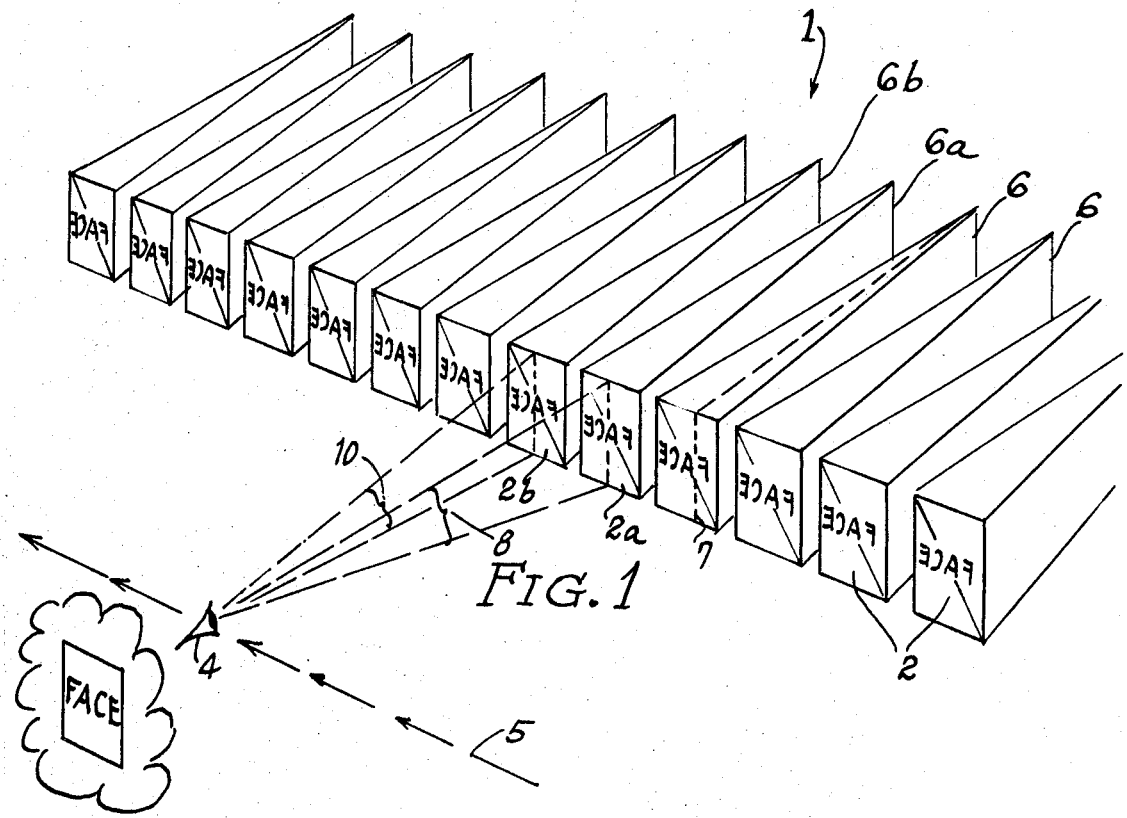
FIG. 1 is a perspective diagrammatic view of an optical shutter system in accordance with the present invention.

Referring now to the drawings and in particular, to FIG. 1, an animated display system 1 is diagrammatically shown which illustrates the optical and dynamic principles incorporated in the present invention. Pellucid sheets 2, which may be photographic transparencies, are mounted in side-by-side generally parallel relationship spaced from a support for an observer represented by eye 4. The vertical light source 6 is disposed on the opposite side of the sheets 2 and seen by the observer 4 through the sheets 2. The light source 6 is either very narrow or is masked or baffled to project a narrow line of light which appears to the observer 4 as a horizontally limited segment 7 of the intermediate pellucid sheet 2. The observer 4 and sheet or transparency 2 are in relative motion and his field of vision of the linear light 6 through sheet 2 is approximately defined by dotted lines 8 and 10. The images carried by the transparencies 2 may be the same as shown in FIG. 1, or progressively and gradually varied. They may also comprise groups of identical images to create a sequence of stills.

If the observer 4 is moving past a transparency 2a of the display system 1 as illustrated by arrows 5, the light from source 6a appears to wipe across the transparency presenting successive vertical segments 7 of the image to the observer. For a viewer moving from right to left as indicated by arrow 5, the picture, as perceived, reverses itself so that the part of it which is observed first, (the right side), appears to the observer to be on the left. As the light source 6b is seen through the right side of the next succeeding transparency 2b, the preceding light source 6a is also seen through the last or left part of the previous image 2a, the first or right part being replaced by corresponding segments of the image on the succeeding transparency. Thus, if each image differs slightly from the preceding one, the composite mental image formed from the perceived vertical segments appears to be in motion, thus creating the desired animated display. In order for this system to function effectively, the transparencies 2 or other pellucid sheets must minimize the diffusion or refraction of light. In general, the higher the transmissibility of the sheet 2, the more efficient is the shutter action.

Figure 5:
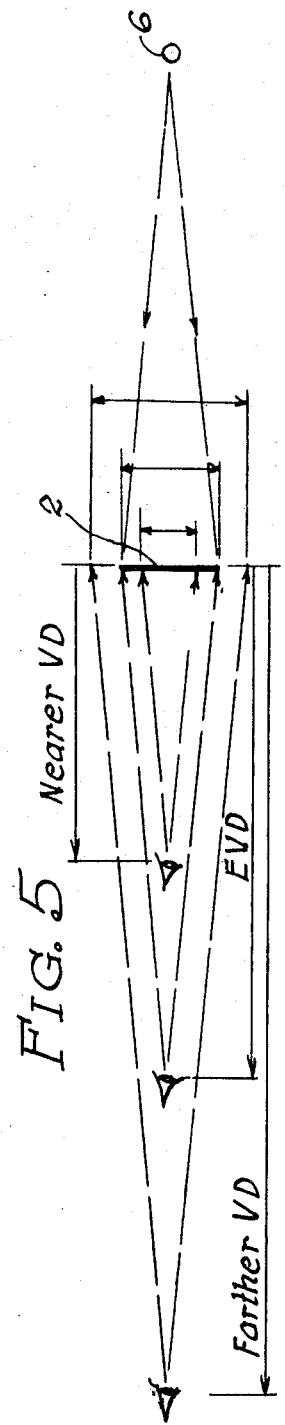
FIG. 5 is a diagrammatic top plan view of an optical shutter illustrating the width of the picture in relation to the ratio of viewing distance to effective light spacing.

In an embodiment such as that of FIG. 1, the preferred distance from the light source 6 to the transparency 2 is equal to the expected viewing distance EVD as shown in FIG. 5. In this case, the width of the image perceived by the observer is equal to the actual width of the transparency and the image will be perceived while the observer is moving a distance equal to twice the width of the transparency 2 along a line parallel to the transparency. If the actual viewing distance is shorter than the distance to the light source 6, the perceived image is narrower than the width of the transparency; if the viewing distance is longer, the perceived image is wider than the transparency. The relationship between the viewing distance and the width of the perceived image is linear; e.g., at a viewing distance one-half of the expected viewing distance EVD, the width of the perceived image is one-half of the transparency width. Also, the relative travel of the observer and the sheet 2 and light source 6 are also proportional to the ratio of distances from the viewer to the sheet 2 and from the light source 6 to the sheet 2. Thus, if a 1:1 ratio of distance is employed and the sheets 2 abut, the observer would be seeing the segmental reconstruction of two sheets 2 at all times. Conversely, if the sheets 2 are spaced apart by the width of a sheet and the distance ration is 1:1, the viewer will see only one segmental image sequence at a given time.

For an expected viewing distance of several feet, as encountered in a subway tunnel or similar environment, placement of the light source 6 behind the transparency at a distance equal to the expected viewing distance is impractical. In the optical shutter system of this invention, the linear light source may be advantageously placed at the side of the transparency and close to the plane thereof and reflective surfaces oriented with respect to the transparency and the light source so that the virtual image of the light source appears behind the transparency at the position described in FIG. 1. The exemplary embodiment of FIG. 6 incorporates a single planar reflective surface. To determine the orientation of the reflective surface 20, the actual position A of the source of the linear light source and the desired position B of its virtual image are first established. A triangle is then formed by drawing rays from the edges C, D of the transparency to the virtual image position and a central axis from B to I. These rays should form an isosceles triangle BCD, the virtual image being centered behind the transparency. If the light source is not centered or if the angle CBD is too great, the visual impression will be one of an apparent acceleration of the sweeping line segment 7 at the normal position I with gradually diminished sweep rates as the angle increases.

Moreover, as the total image is the total visual effect of these segments integrated over a short period of time, a large angle or offset light source will produce image distortion, effectively stretching the image for the larger angles. This can, where necessary, be compensated by introducing distortion into the image on the pellucid sheet 2.

The triangle BCD is effectively "folded" about a line EF with a reflective surface so that the vertex B of the triangle coincides with the actual position A of the light source 6. A planar reflective surface 20, placed on this fold line or crease EF in accordance with known reflective theory, reflects the rays of the linear light emanating from the light source 6 to the transparency 2 in the same pattern as if the light source were actually located at the virtual image position B. Thus, a viewer moving past the transparency sees a line of light moving with him across the transparency, illuminating successive sections of the transparency 2 in the same manner as already described.

Figure 3:
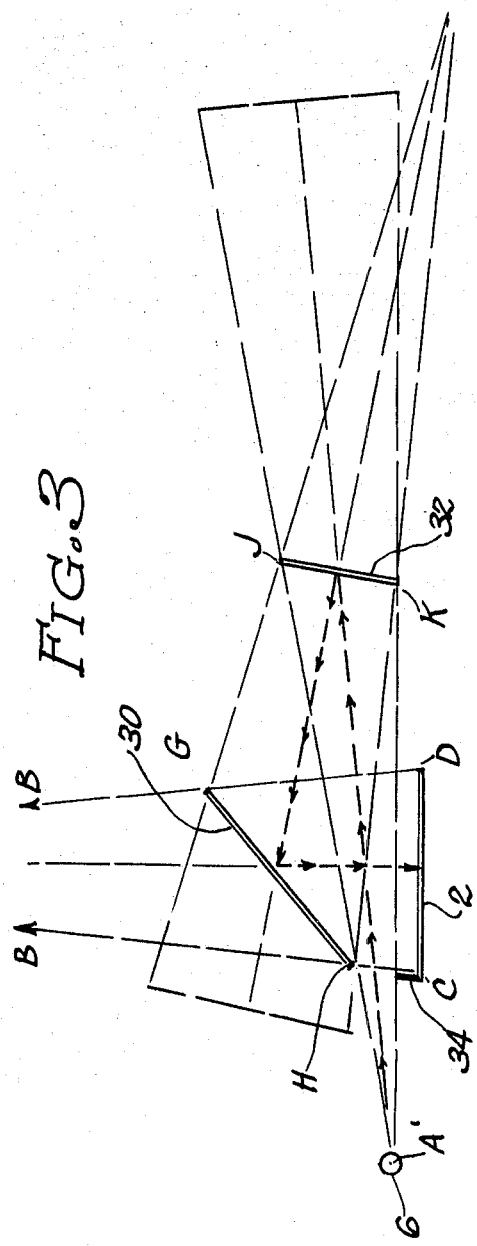
FIG. 3 is an enlarged diagrammatic top plan view of the optical shutter of the system of FIG. 2.

The use of a single reflective surface allows for placement of the light source close to the edge of the transparency, providing a concomitant reduction in the depth of the installation of up to 50 percent. Further reduction is achieved by employing a multiplicity of reflective surfaces to fold the triangle defined by the edges of the transparency and the virtual image position of the light source. For example, if this scheme is used to display an animated picture on the wall of the subway, a minimum amount of depth is available. An embodiment adapted to this environment is shown in FIG. 3, wherein the triangular segment is folded twice by reflective surfaces 30 and 32. To determine their placement, first the position of the rearward edge of the first reflective surface is placed at the intersection G of the ray DB with a line 33 defining the maximum depth of the shutter system. The other criteria established for folding the triangle BCD are secondly, the light source and the rearward edge of the second reflective surface should be approximately laterally equidistant from the edges of the transparency; and thirdly, the forward edge of the linear light from the light source 6 should pass close behind and preferably parallel to the transparency, with the vertex of the triangle resting on the A′, the actual position of the light source 6. The angular displacement of the reflective surfaces is determined by anchoring triangle BCD at the rearward point G on the first surface, and adjusting the pitch of the first foldline GH and the pitch and placement of the second foldline JK until the criteria established in the second and third steps are met, bearing in mind the fundamentals of reflective theory. The two reflective surfaces 30 and 32 are then placed on the creases GH and JK in the triangle. If triangle BCD is properly folded, the length of a ray from a point on the transparency is the same whether drawn to the real position A′ or the virtual position B of the light source. The light source 6 is located farther laterally from the edge of the transparency than in the embodiment of FIG. 6 to optimize the space available. A baffle 34 is preferably added to the edge of the frame holding the transparency 2 so that no light from the source 6 can produce false sweeps or ghosts in the projected image. Baffles should be located in the system wherever there is a possibility that spurious light can impinge upon the sheet 2.

Figure 2:
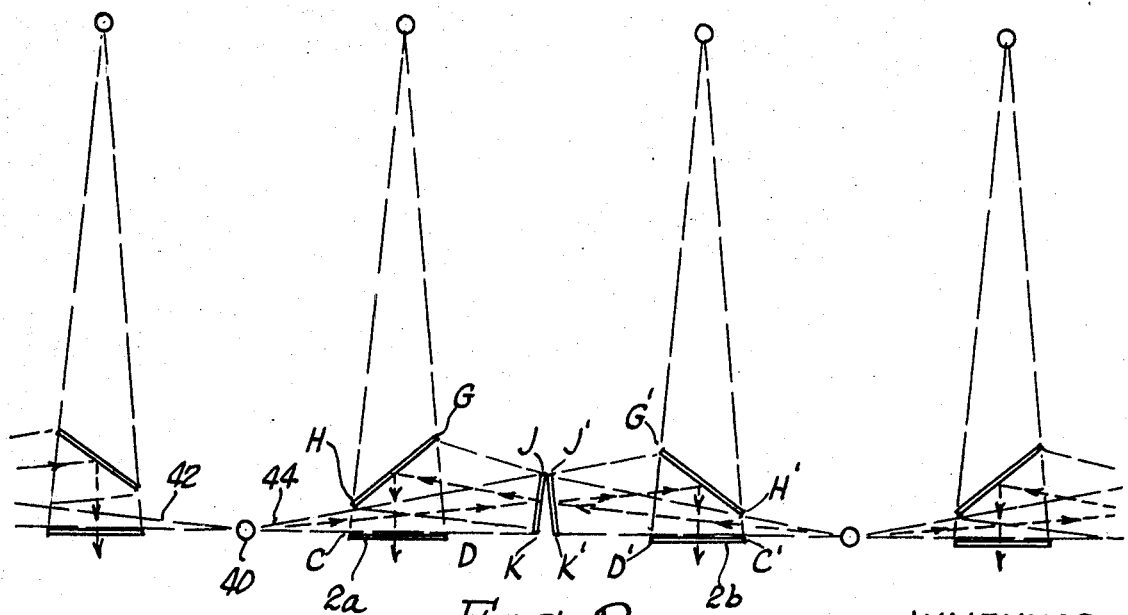
FIG. 2 is a diagrammatic top plan view of portions of another optical shutter system designed in accordance with the present invention utilizing reflective surfaces to reduce the depth of the system.

In an embodiment such as that of FIG. 2 wherein the optical shutter system projects a succession of images to a passing observer, a single fluorescent tube may serve as the light source 40 for two adjacent sheets 2, the tube having baffles to provide two diversely directed light sources 42 and 44. Because of the lateral relative displacement of the light source and the second reflective surface, a dark space intervenes between two adjacent transparencies 2a and 2b. However, as already explained, this is not detrimental because of the visual overlap of the adjacent images as seen by an observer if the images are contiguous.

If more depth is available and closer lateral spacing is desirable, an optical shutter using three reflective surfaces 50, 52, 54 as shown in FIG. 7, may be used. The light source is much closer to the transparency so that the light is less susceptible to observation by the viewer and the necessity of a baffle is eliminated. A baffle may still be employed with some beneficial results.

Figure 11:
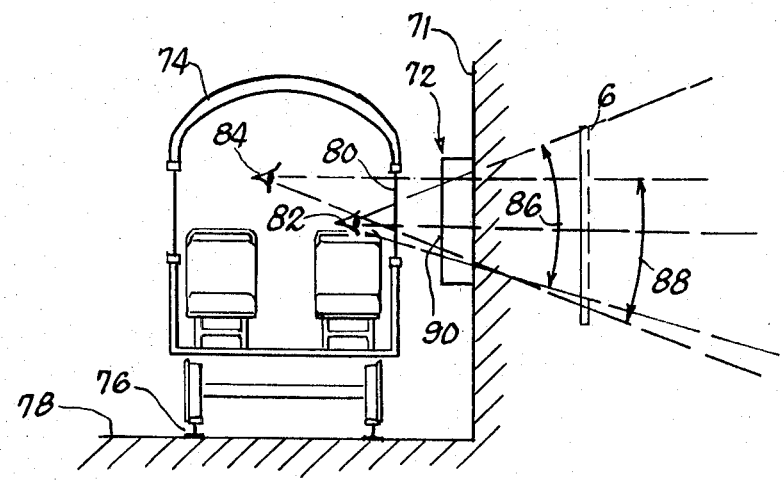
FIG. 11 is an elevational view diagrammatically illustrating the application of the invention to a subway train and tunnel.
Figure 12:
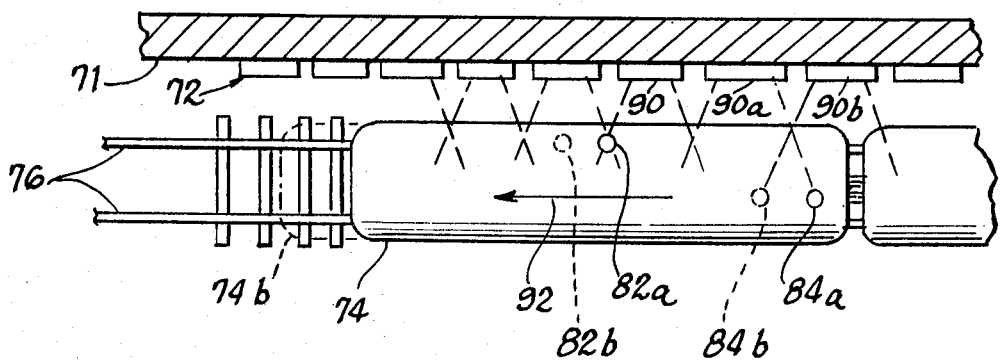
FIG. 12 is a plan view diagrammatically illustrating the application of FIG. 11.

While the system functions in ambient light with very little shielding it is important that the observer does not see any spurious light sources through the pellucid sheet. Thus it is preferred that the entire assembly be mounted within a box such as shown in FIGS. 11 and 12 or in a similar housing. Even where space is available and the system is constructed as in FIG. 1, it is preferred that the arrangement be shielded to avoid the impingement of sun light, head lights or other spurious sources. In some applications the reflectors and a light valve defining a linear slit can be employed with the slit filled with a diffusive material to constitute a source and sun light can be used as the source of energy, for example, eliminating the electrically energized light source contemplated in FIG. 1.

Figure 4:
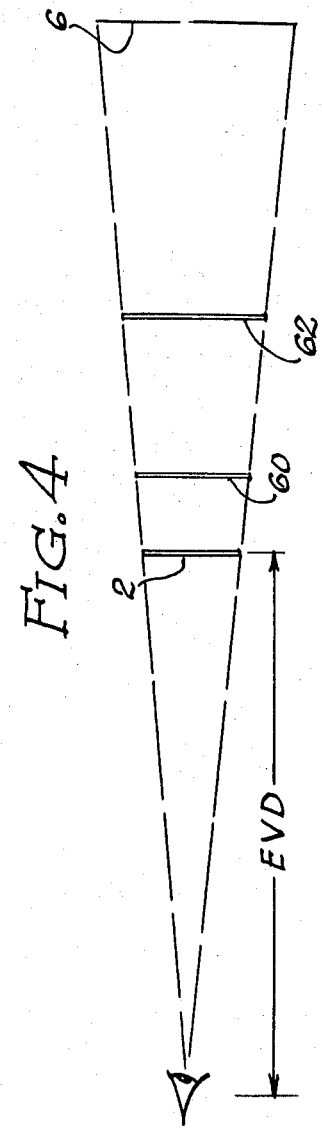

FIG. 4 is a diagram taken perpendicular to the direction of relative movement. It illustrates that the relative heights of the elements of the optical shutter system, where the movement is horizontal, are a function of the height of the transparency 2 and the expected viewing distance EVD. Thus a light source placed at a distance from the transparency equal to the expected viewing distance should extend twice as far from the viewing axis in both directions as the transparency. In a typical optical shutter system having two reflective surfaces, the first reflector 60 is one-seventh of the way to the light source and thus has a height 115 percent of the height of the transparency from the viewing axis; the second reflector 62 is two-thirds of the way to the light source and thus has a height equal to 167 percent of the height of the transparency from the viewing axis. This, of course, makes no allowance for variations in the vertical location of the viewer as indicated by arrows 61 and 63. Additional height of all elements must be provided to accommodate a range of viewing heights.

In all embodiments, front silvered mirrors are preferably used as the reflective surfaces to prevent diffusion of the reflected linear light and a ghost from the front surface. Moreover, the lamp used as the light source is preferably operated on direct current (DC) or a very high frequency as the shutter system displays a wave impression during operation on AC and at 60 Hertz this wave can be noticeable. At high relative speeds, it could even be irritating and damage the visual effects.

A concave reflector 70 shown in FIG. 8 may replace the planar reflective surfaces, especially where both depth and lateral spacing are limited. A curved reflector places the virtual image of the light source in any desired position, while greatly shortening the rays from the light source. As is well understood, a convex reflector would provide an opposite result. While the curvature and angular disposition of the reflector can be derived mathematically, the curvature of the reflector is readily derived utilizing an empirical method illustrated in FIG. 9. The transparency and light source are positioned, the estimated viewing distance is established, and the virtual image position is located behind the transparency, preferably at a distance substantially equal to the estimated viewing distance. Rays ML through QL are drawn from the transparency 2 to the virtual light L. To determine the points on the rays ML through QL where the curved reflecting surface lies, a first line RS is drawn parallel to the transparency from the linear light source 6 to the farthest ray QL. The angle RSL interior to both the virtual and real positions of the light source is bisected and the bisector ST is extended to intersect the next ray PL at point T. These two points of intersection S and T both lie on the curved reflecting surface 70. A line RT is drawn from the light source 6 to this now-defined point of intersection T, and the angle RTL between line RT and the ray PL is bisected. This bisector TU is extended to the next ray OL and intersection U also lies on the curved reflecting surface 70. This process continues until points are defined on each ray ML through QL, defining the curvature of reflecting surface 70. The accuracy of definition of the curvature is a function of the number of rays selected and constructed from the transparency 2 to the virtual light L. A single smooth curve is then drawn connecting these points and this provides what is in effect a combination of a convex lens and a canted mirror to both shorten the position of the virtual light source L and relocate it in the folded position R. A baffle 65 is preferably disposed at point M to avoid direct impingement of light from source 6 on sheet 2.

A single light source may supply the linear light for adjacent optical assemblies using curved reflectors as shown in FIG. 10. The curvature of the left surface half 68 is derived in the same fashion as the right half 70. An observer moving from right to left past the assembly 72 including the associated transparencies 2e and 2f perceives successive segments of the first image 2f from right to left and then the second image 2e. Thus the system using curved mirrors functions in essentially the same fashion as the system of FIG. 1. Baffles (not shown) are also disposed between the light and the edge of the transparency.

One particular application of the optical shutter system is illustrated diagrammatically in FIGS. 11 and 12. Therein a virtual light source 6V is shown located behind the vertical wall 71 of a subway cavity which has mounted thereon as assembly 72 for use with the optical shutter system described herein. A subway train 74 moves on tracks 76 which are supported on subway floor 78 and thus a rigid viewing platform is established relative to the assembly 72. The viewer may be at various points in the subway train 74 and observe the display assembly 72 through the train window 80. For example, the viewing position of a seated passenger is indicated diagrammatically by eye 82 and that of a standing passenger by eye 84.

As is apparent from the broken line viewing angle 86 for the seated passenger and the broken line viewing angle 88 for the standing passenger, optimum viewing will be available to all of them provided only that all of the reflective surfaces and the light source represented by virtual source 6V are properly proportioned to fill the entire height between the extremes of the viewing angles. The selection of a viewing distance for the position of the virtual light source 6V is preferably about equal to the maximum distance of a viewer, such as standing viewer 84, from the image on pellucid sheet 90. With this criteria the proportions should be satisfactory for all viewing distances less than this maximum, and will improve the reproduction for the sitting viewer 82.

FIG. 12 shows the same diagrammatic subway system but illustrates how the sitting viewer 82 will see a continuous reconstruction of the image as he moves from the solid line position 82a to the broken line position 82b. In the case of a passenger who is more distant from the pellucid sheet 90, such as standing passenger 84, he will actually see an initial line segment of the image of sheet 90a when he is at position 84a and will at the same time be seeing a central line segment preceding image 90b as he moves in the direction of arrow 92. When this viewer reaches point 84b (when the train has reaches the broken line position 74b), viewer 84 will see the final left hand line segment of image 90b (which is the right hand line segment of the actual visual impression on the viewer). Shortly thereafter he will begin to see the first line segment of image 90. As already explained, because of the speed of relative travel and the image retention of the human retina and sensory system, the viewer is unaware of the segmenting of the images and sees only a single full field image. If the images vary in an animated sequence, the viewer will receive a mental impression of animation very much like that of a motion picture.

The system is operative for a wide range of relative speeds of the sheet and viewer provided only that the speed is sufficient to provide a continuous visual impression based upon the persistence of the eye. Furthermore, the system may be experiencing either acceleration or deceleration over a wide range without adverse affects. The only significant effect on the visual impression is in the case of animated displays where the animation is either retarded or accelerated. Either the viewer or sheet and light assembly may be moving in an arcuate path, or the two may be converging or separating and the visual impression will be substantially the same. However, if such variations are substantial it may be desirable to take them into account in the design of the shutter system assembly.

For maximum optical resolution the light source should be as narrow as possible, preferably having no perceptible width. However, in general the amount of light available is directly related to the width of the source and thus these two parameters are balanced in a given design to provide maximum image resolution with optimum light intensity. The light may be baffled or otherwise treated to provide an adjustable width, if so desired.

While several particular embodiments of this invention are shown above and described, it will be understood, of course, that the invention is not to be limited thereto, since many modifications may be made. Specifically, excellent results have been obtained by mounting the pellucid sheets, optics and light source for movement relative to a fixed view. It is contemplated, therefore, by the appended claims, to cover any such modifications as fall within the true spirit and scope of this invention.

I claim:

1. In an arrangement for providing a viewer with a sequentially constructed visual effect of an image, the combination comprising a pellucid sheet on which said image is reproduced, a source of light mounted in spaced relationship on one side of said sheet and providing a narrow elongate radiating light source generally parallel to said sheet, means supporting said viewer and said sheet in spaced relationship with said viewer disposed on the side of said sheet opposite said light source, and means providing relative movement between said viewer and said sheet, said movement being generally parallel to said sheet and normal to said light source whereby said viewer sees said narrow elongate light source through only a given segment of said image bearing sheet at any given instant of time and the relative movement of said viewer and said sheet sequentially exposes said elongate light source to view through adjacent segments of said image bearing sheet whereby the image is constructed as a complete visual effect for the viewer as said viewer and sheet move relatively.

2. The arrangement of claim 1 wherein said image bearing pellucid sheet is a photographic transparency.

3. The arrangement of claim 1 wherein said sheet is a substantially planar rectangle.

4. The arrangement of claim 3 wherein said sheet is mounted in a substantially vertical position, said light source is mounted substantially vertically and parallel to said sheet and the relative movement of said viewer and said sheet is substantially horizontal and parallel to said sheet.

5. The arrangement of claim 1 wherein the effective spacing between said sheet and said light source is substantially equal to the normal distance between said sheet and said viewer.

6. The arrangement of claim 1 wherein said sheet and light source are fixed and the means for providing relative movement between the sheet and the viewer is a movable vehicle.

7. The arrangement of claim 5 wherein said sheet and said light source are fixed and the means for providing relative movement is a wheeled passenger carrying vehicle.

8. The arrangement of claim 7 for use in a subway system having walls and wheeled vehicles, said sheet and light source being mounted on a wall of said subway and said wheeled vehicles moving generally parallel to said wall.

9. The arrangement of claim 1 including a plurality of sheets in aligned relationship and an elongate narrow light source cooperating with each of said sheets, said sheets being aligned on an axis generally parallel to the direction of relative movement.

10. The arrangement of claim 8 including a plurality of sheets in aligned relationship along said wall, said wheeled vehicles having windows and said windows and sheets being aligned whereby said light sources can be viewed through said sheets and said windows.

11. The arrangement of claim 9 wherein all of said plurality of sheets have the same image thereon whereby the viewer is provided with a single sustained visual effect.

12. The arrangement of claim 9 wherein each of said sheets has an image thereon related to but different from the images on the adjacent sheets whereby an animated visual effect is provided the viewer.

13. The arrangement of claim 1 wherein the light source is longer than the corresponding generally parallel dimension of the sheet whereby the viewer will see the light source through substantially the entire area of said sheet.

14. The arrangement of claim 1 wherein a reflective surface is disposed in a generally overlying relationship to said sheet on the side of said sheet opposite said viewer, and said light source is aligned with said reflective surface whereby the light source is viewed on the reflective surface through said sheet as the viewer and sheet move relatively whereby a virtual light source is provided on the side of said sheet opposite the viewer.

15. The arrangement of claim 14 wherein said light source is disposed adjacent and generally parallel to one edge of said sheet, baffle means are provided to prevent the impingement of light directly from said source onto said sheet and said reflective surface is oriented to provide visual observation of said light source through said sheet and from said reflective surface as said sheet and said viewer move relatively.

16. The arrangement of claim 15 wherein a plurality of reflective surfaces are employed with said sheet and said light source to provide a reflective system adjacent said sheet to reduce the depth of said arrangement.

17. The arrangement of claim 16 wherein two adjacent sheets are provided with a single light source therebetween, each of said sheets being provided with a baffle and a reflective system associated with said light source.

18. The arrangement of claim 15 wherein said reflective means is a cylindrical reflector curved about an axis parallel to said light source to provide a substantially complete sequential construction of said image with reduced depth of said arrangement.

19. A method for projecting a sequentially constructed visual effect of an image reproduced on a pellucid sheet and illuminated by a source of narrow elongate light to a viewer where there is relative motion between the viewer and the sheet generally parallel to the sheet and normal to said light source so that the elongate light appears to sweep laterally across said pellucid sheet presenting successive segments of the image on the sheet to the viewer, said method comprising establishing the lateral boundaries of the pellucid sheet, positioning the elongate source of light in spaced relationship on one side of the sheet, establishing the position of the virtual position of the light source behind the sheet so that the boundaries of the sheet and the light source define a triangle, folding the triangle so that its apex rests on the actual position of the source of light, and placing a planar reflective surface in the vertical plane defined by the crease in the triangle so that the light source appears to the observer at the selected virtual image position and is viewed sequentially through adjacent segments of said sheet to construct said image.

20. A method for projecting a sequentially constructed visual effect of an image, reproduced on a pellucid sheet and illuminated by a source of a narrow elongate light radiating generally parallel to said sheet, to a viewer in motion generally parallel to the sheet and normal to said light source, said method comprising establishing the real position of the elongate light source and its virtual position relative to the pellucid sheet, defining paths for light rays from the virtual position to the sheet, drawing a first line from the light source real position to the farthest ray at a predetermined point spaced from said sheet, bisecting the angle defined by said first line and said ray and interior to the real and virtual positions of the light source, extending the bisector to an intersection with the adjacent ray, drawing a second line from the light source position to the intersection, bisecting the interior angle defined and extending the bisector to an intersection with the adjacent ray, repeating the process for all the rays, and placing a smoothly curved cylindrical reflective surface in the vertical plane defined by these points of intersection so that elongate light appears to sweep laterally across said sheet as the viewer and sheet move relatively presenting successive segments of the sheet to the viewer whereby the image is reconstructed as a complete visual effect.

21. In an arrangement for providing a sequentially constructed visual effect of an image to a viewer in relative motion parallel to the arrangement, the combination comprising a housing, a pellucid sheet on which said image is reproduced mounted in an opening in said housing, a source of light mounted in spaced relationship adjacent one edge of said sheet within said housing and providing a narrow elongate radiating light source generally parallel to said sheet, and a reflective surface disposed in a generally aligned relationship to said sheet within said housing, said light source being aligned with said reflective surface and said reflective surface being oriented so that the light source is viewed on the reflective surface through said sheet for each position of said viewer outside of said housing and spaced from said sheet whereby said elongate light source is exposed to view through segments of said image bearing pellucid sheet determined by the positions of the viewer, and the image is constructed as a complete visual effect for the viewer whenever the viewer and sheet move relatively so that the viewer assumes all positions across the opening in said housing.

22. The arrangement of claim 21 wherein said light source is disposed adjacent and generally parallel to one edge of said sheet, baffle means are provided within said housing to prevent the impingement of light directly from said source onto said sheet and said reflective surface is oriented to provide visual observation of said light source through said sheet and from said reflective surface as said sheet and said viewer move relatively.

23. The arrangement of claim 22 wherein a plurality of reflective surfaces are disposed within said housing and employed with said sheet and said light source to provide a multiple stage reflective system adjacent said sheet to reduce the depth and width of said arrangement.

24. The arrangement of claim 23 wherein two adjacent sheets are provided in said housing with a single light source therebetween, each of said sheets being provided with a baffle and a reflective system associated with said light source.

25. The arrangement of claim 22 wherein said reflective means is a cylindrical reflector curved about an axis parallel to said light source to provide a substantially complete and undistorted sequential construction of said image with reduced depth of said arrangement.

* * * * *